United States Patent [19]

Andis

[11] Patent Number: 4,695,704
[45] Date of Patent: Sep. 22, 1987

[54] HAIR GROOMING ATTACHMENT FOR A CURLING IRON

[76] Inventor: Matthew L. Andis, 5315 Wind Point Rd., Racine, Wis. 53402

[21] Appl. No.: 655,320

[22] Filed: Sep. 27, 1984

Related U.S. Application Data

[60] Division of Ser. No. 415,372, Sep. 7, 1982, Pat. No. 4,496,825, which is a continuation-in-part of Ser. No. 059,676, Jul., 1979, abandoned.

[51] Int. Cl.⁴ .......................... A45D 1/04; A45D 1/18; H05B 3/00
[52] U.S. Cl. ................... 219/222; 132/11 R; 132/33 R; 132/37 R; 132/85; 132/118; 219/225; 219/244; 219/533; 403/165; 403/361
[58] Field of Search ................. 219/222–226, 219/230, 242, 533, 244; 403/165, 361; 132/9, 11 R, 33 R, 37 R, 37 A, 39, 41, 85, 117, 118

[56] References Cited

U.S. PATENT DOCUMENTS

| 434,295 | 8/1890 | Richardi | 403/165 X |
| 2,888,937 | 6/1959 | Weldon | 132/39 X |
| 3,135,269 | 6/1964 | Pauldine | 219/222 X |
| 3,937,230 | 2/1976 | Kenney | 132/37 R |
| 3,973,528 | 8/1976 | Walter et al. | 132/37 R |
| 4,024,375 | 5/1977 | Olesen et al. | 132/37 R |
| 4,194,850 | 3/1980 | Cranmore | 403/361 X |
| 4,217,915 | 8/1980 | Gress et al. | 132/9 |
| 4,267,851 | 5/1981 | Plaisted | 132/39 X |
| 4,292,986 | 10/1981 | Ergaver et al. | 132/11 R |
| 4,326,545 | 4/1982 | Motegi et al. | 219/225 X |
| 4,358,660 | 11/1982 | Andis | 219/222 |
| 4,365,426 | 12/1982 | Suzuki et al. | 132/9 |
| 4,368,376 | 1/1983 | Andis | 219/222 |
| 4,419,565 | 12/1983 | McGaw | 219/222 |
| 4,443,688 | 4/1984 | Andis | 219/222 |
| 4,456,815 | 6/1984 | Andis | 219/225 |
| 4,468,554 | 8/1984 | Andis | 219/222 |
| 4,496,825 | 1/1985 | Andis | 219/222 |

FOREIGN PATENT DOCUMENTS

| 46887 | 3/1982 | European Pat. Off. | 132/85 |
| 2152458 | 5/1973 | Fed. Rep. of Germany | 403/361 |
| 3000459 | 7/1981 | Fed. Rep. of Germany | 132/9 |
| 941802 | 11/1963 | United Kingdom | 219/222 |
| 2022406 | 12/1979 | United Kingdom | 219/222 |

Primary Examiner—Anthony Bartis
Attorney, Agent, or Firm—Michael, Best & Friedrich

[57] ABSTRACT

A curling iron includes an elongated heating element attached at one end to a handle and having an outer circular peripheral surface provided with a plurality of generally arcuately spaced, radially open grooves extending longitudinally on the outer peripheral surface of the heating element between the first end adjacent the handle and second free end, with the grooves being axially open at the second end. Plurality of bars supporting hair grooming members are slidingly removably engaged in the grooves through the open ends thereof in heat exchange relation with the heating element. An auxiliary handle is attached to the second end of the heating element for preventing removal of the bars from the grooves, there being free, unlimited, bidirectional relative rotation between the auxiliary handle and the heating element. Alternatively, a removable thermally conductive sleeve may be slidably mounted on the heating element and has an inner surface locatable in heat exchange relationship with the heating element and includes at least one tab slidably receivable in one of the grooves through the open end thereof for preventing relative rotation between the sleeve and the heating element. The sleeve also includes, on the outer surface thereof, a plurality of generally arcuately spaced longitudinally extending radially open grooves for alternatively receiving the bars.

7 Claims, 12 Drawing Figures

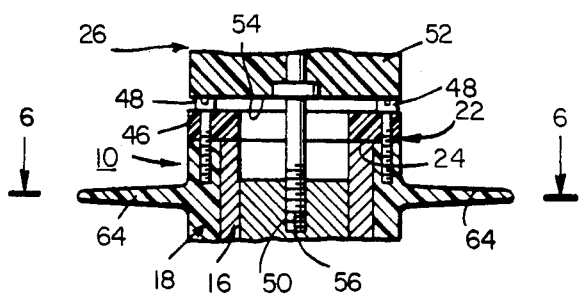
FIG. 5
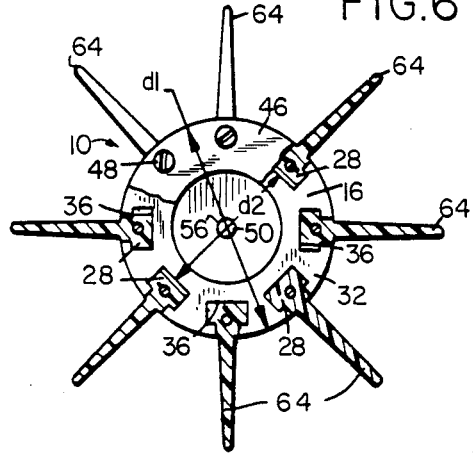
FIG. 6
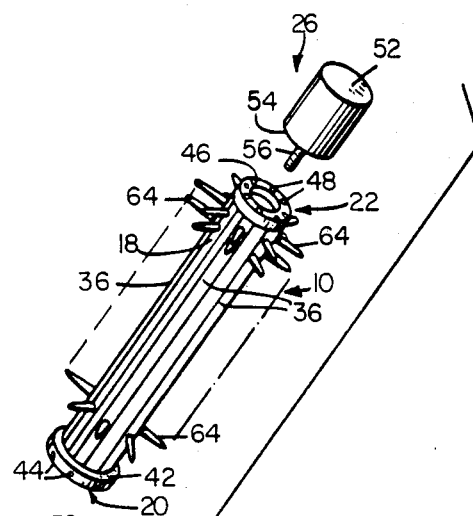
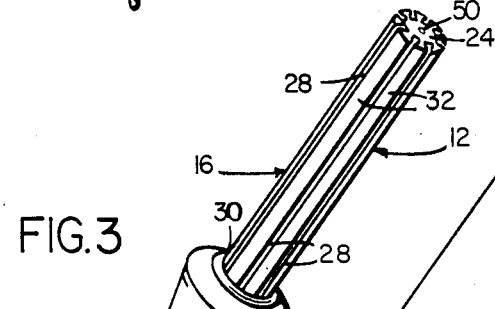
FIG. 3
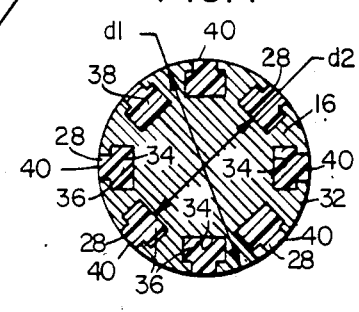
FIG. 7
FIG. 4

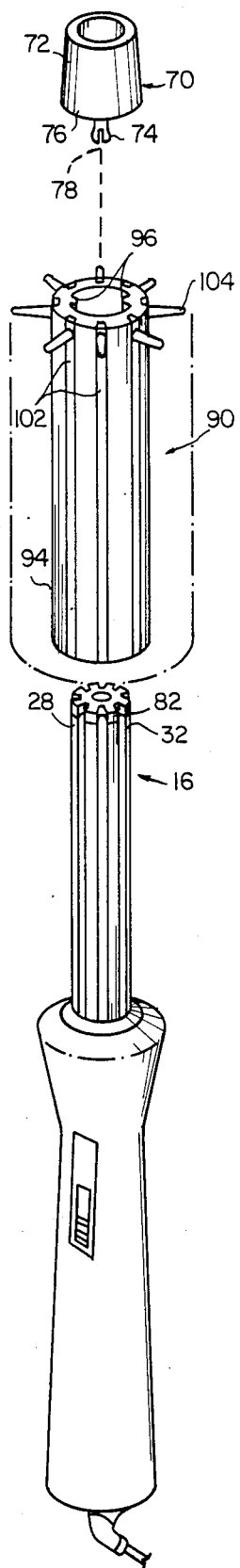
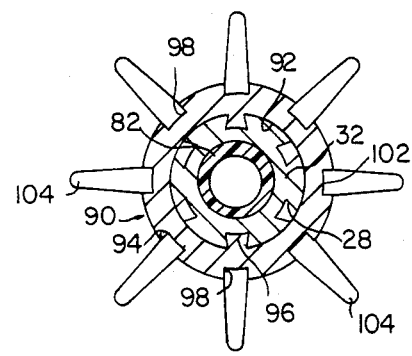
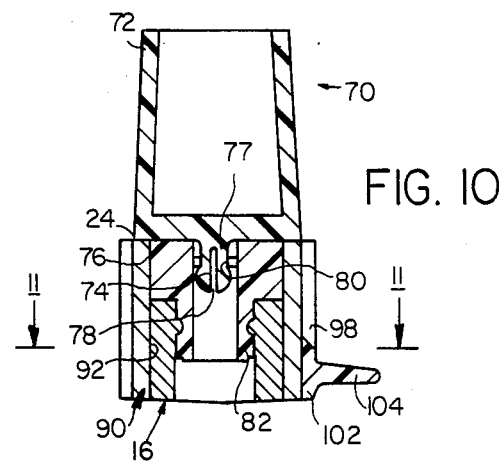
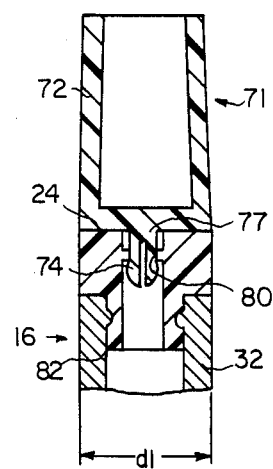

HAIR GROOMING ATTACHMENT FOR A CURLING IRON

FIELD OF THE INVENTION

This application is a division of application Ser. No. 415,372, filed Sept. 7, 1982, now U.S. Pat. No. 4,496,825, issued Jan. 29, 1985, which application Ser. No. 415,372 is a continuation-in-part of application Ser. No. 059,676, filed July 23, 1979 and now abandoned.

The invention generally relates to hair grooming devices. More particularly, the invention relates to curling irons and hair grooming devices usable in combination with curling irons.

BACKGROUND OF THE INVENTION

Curling irons are widely used to curl or otherwise style hair. To facilitate the use of curling irons in creating particular hair styles, curling irons typically include integral hair grooming assemblies such as hair clamping members which are used in forming small or "tight" curls or brushes which are used in forming large or "loose" curls and waves.

SUMMARY OF THE INVENTION

The invention provides a hair grooming attachment for a curling iron having a handle and a heating element which extends from the handle. The attachment generally comprises a main body portion having an inner diameter which permits sliding attachment of the main body portion upon the heating element. The main body portion includes a first end having an inner diameter at least equal to the inner diameter of the main body portion to thereby accommodate the sliding attachment of the main body portion upon the heating element through the first end. The main body portion also includes an oppositely spaced second end which has an inner diameter less than the inner diameter of the main body portion to prevent sliding attachment of the main body portion on the heating element beyond the second end.

In one embodiment of the invention, the hair grooming attachment includes fastening means engagable with the heating element and the second end of the main body portion for securing the second end of the main portion between the fastening means and the heating element. The entire grooming attachment can be thereby removably secured to the heating element during use.

In one embodiment of the invention, the curling iron includes means which defines a plurality of generally arcuately spaced grooves extending longitudinally on the outer peripheral surface of the heating element. The outer peripheral surface of the heating element has a first diameter, and the grooves have inner peripheral surfaces concentric with the outer peripheral surface and having a second diameter less than the first diameter. In this embodiment, the hair grooming attachment comprises an annular frame including a plurality of arcuately spaced support bars which are slidably engaged in the grooves. More particularly, the arcuately spaced support bars have an outer diameter which is generally equal to the first diameter and an inner diameter which is generally equal to the second diameter.

In one embodiment of the invention, the annular frame includes a first frame end having an inner diameter at least equal to the first diameter to accommodate the sliding engagement of the support bars in the grooves through the first frame end, as well as an oppositely spaced second frame end having an inner diameter less than the first diameter to prevent the sliding engagement of the support members in the grooves beyond the second frame end and to thereby provide an abutting engagement between the second frame end and the outer end of the heating element. In this embodiment, the length of the annular frame is less than the length of the heating element, and the abutment between the second frame end and the outer end of the heating element maintains the first frame end in a spaced relationship from the handle end of the heating element to permit heat expansion of the annular frame during operation of the curling iron.

In one embodiment of the invention, the hair grooming attachment includes a hair clamping member which is pivotally attached on the annular frame and which is slidingly engaged on the heating element in common with the annular frame. The hair clamping member permits use of the curling iron to make small or "tight" curls.

In an alternate embodiment, a plurality of generally spaced bristles project outwardly from the annular frame and collectively form a brush which permits use of the curling iron to make large or "loose" curls. The brush, like the just described hair clamping member, is slidingly engaged on the heating element in common with the annular frame. Thus, the hair grooming attachment having the brush is freely interchangeable with the hair grooming attachment having the hair clamp, and a single curling iron can be used to form both large and small curls.

The invention also provides a hair curling iron comprising a handle, an elongated heating element attached to said handle and having an outer surface, a first end adjacent to said handle and a second end spaced outwardly from said handle, means defining a plurality of generally arcuately spaced grooves heating element between the first end and the second end and being axially opened at the second end, a removable sleeve slidable on the heating element having an inner surface and an outer surface and including at least one tab on the inner surface of the sleeve in the grooves, and removable hair grooming means slidable on the sleeve.

The invention also provides a hair curling iron comprising a handle, an elongated heating element attached to the handle and having a first end adjacent to the handle and a second end spaced outwardly from the handle. The second end includes an opening therein coaxial with the longitudinal axis of the elongated heating element. An end member is releasably attached to the second end of the heating element, and the end member comprises a body member with an end. A generally ball-shaped member is attached to the end and receivable in the opening in the heating element. The ball member has a diameter greater than the diameter of the opening, and the ball member includes a slot coaxial with the body member to permit the ball memt'er to compress in the opening.

One of the principal features of the invention is an attachment for the heating element of a curling iron, which attachment, allows interchangeable connection with a single curling iron.

Other features and advantages of the embodiments of the invention will become known by reference to the following general description, claims, and the drawings.

DESCRIPTION OF THE DRAWINGS

FIG. 3 is an exploded view of a curling iron and a hair grooming attachment which is slidably engagable thereon;

FIG. 4 is a sectional view of the grooming attachment taken generally along line 4—4 in FIG. 2;

FIG. 5 is a fragmentary sectional view of the grooming attachment and the related fastening means taken generally along lines 5—5 in FIG. 1;

FIG. 6 is a view taken generally along line 6—6 in FIG. 5 with certain parts shown in section and certain parts shown in full lines.

FIG. 7 is a sectional view of the grooming attachment taken generally along line 7—7 in FIG. 2.

FIG. 8 is an exploded view of a curling iron, a hair grooming attachment which is slidably engagable thereon and fastening means.

FIG. 9 is fragmentary sectional view of a heating element and end member.

FIG. 10 is a fragmentary sectional view of a heating element, hair grooming attachment and a fastening means.

FIG. 11 is a cross sectional view of the heating element and hair grooming attachment shown in FIG. 8.

Figure 1:
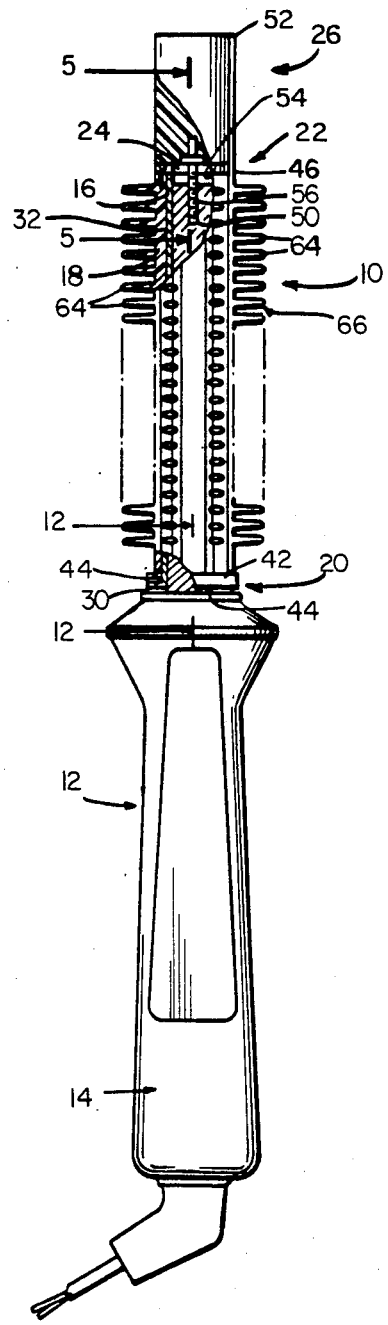
FIG. 1 is a hair grooming attachment having bristles forming a brush and which is slidably engaged upon the heating element of a curling iron.

Before explaining the embodiments of the invention in detail, it is to be understood that the invention is not limited in its application to the details of construction and the arrangement of components set forth in the following description and as illustrated in the drawings. The invention is capable of other embodiments and of being practiced and carried out in various ways. Also, it is to be understood that the phraseology and terminology used herein for the purpose of description should not be regarded as limiting.

GENERAL DESCRIPTION

Shown in the drawings is a hair grooming attachment 10 and its use in connection with a curling iron 12. The curling iron 12 generally includes a handle 14 and a heating element 16 extending from the handle 14 (as is best shown in FIG. 3). The element 16 is electrically operated to radiate heat, and the grooming attachment 10 generally serves to facilitate the use of the radiated heat to curl or otherwise style the operator's hair.

Figure 2:
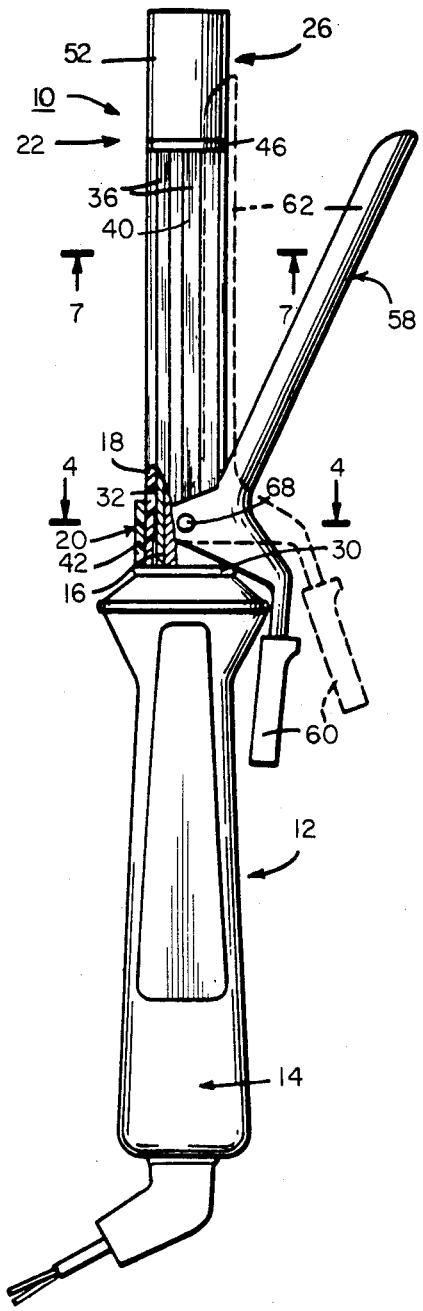
FIG. 2 is a hair grooming attachment having a pivotally attached hair clamping member and which is slidably engaged upon the heating element of a curling iron and interchangeable on the heating element with the brush attachment shown in FIG. 1.
Figure 12:
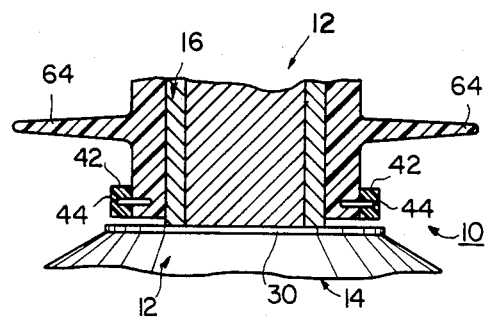
FIG. 12 is a fragmentary view taken generally along line 12—12 in FIG. 1, with certain parts shown in section, and with certain parts shown in full lines.

Referring first principally to FIGS. 1, 2, and 3, the attachement 10 generally includes a main body portion 18 which has a inner diameter sufficient to permit sliding attachment of the main body portion 18 upon the heating element 16. The main body portion 18 includes a first end 20 which has an inner diameter at lease equal to the inner diameter of the main body portion 18 and an oppositely spaced end 22 which has an inner diameter less than the inner diameter of the main body portion 18. By virtue of this construction, the first end 20 accommodates the sliding attachment of the main body portion 18 upon the heating element 16, while the second end 22 does not. Thus, sliding attachment of the main body portion 18 upon the heating element 16 is permitted only through the first end 20 (as shown in FIG. 3), and the sliding attachment thereafter progresses until the second end 22 of the main body portion 18 reaches the outer end 24 of the heating element 16 (as shown in FIGS. 1 and 2). The difference in diameters between the second end 22 and the outer end 24 (see FIGS. 1 and 5) blocks further sliding attachment of the main body portion 18 beyond the second end 22.

As is best shown in FIGS. 1, 2 and 5, fastening means 26 is engagable with the heating element 16 and the second end 22 of the main body portion 18 to secure the second end 22 between the fastening means 26 and the heating element 16 and thereby hold the grooming attachment 10 in place upon the heating element 16.

It should be appreciated that the hair grooming attachment 10 as just generally described is broadly applicable for use in combination with curling irons of various constructions, and the particular construction of the attachment 10 may be varied according to the design of the associated curling iron as well as the particular hair curling or styling function sought to be accomplished.

In the illustrated embodiment (as best shown in FIG. 3), the curling iron 12 includes a plurality of arcuately spaced grooves 28 extending longitudinally along the outer peripheral surface 32 of the heating element 16 between the handle end 30 of the element 16 and the outer end 24 thereof. As can best be seen in FIG. 7, the outer peripheral surface 32 of the heating element 16 has a first diameter d1, and the arcuately spaced grooves 28 have inner peripheral surfaces 34 concentric with the outer peripheral surface 32 of the element 16 and having a second diameter d2 which is less than the first diameter d1. It should be appreciated that the specific shape of the grooves 28 may be varied from that shown in the drawings. For example, the grooves 28 may take the form of a dovetail as as well as any square, rectangular, or arcuate indentation formed in the outer peripheral surface 32 of the heating element 16.

In this embodiment, the main body portion 18 of the grooming attachment 10 forms an annualar frame or cage (see FIG. 3) which includes a plurality of arcuately spaced support bars 36. While the frame 18 may be constructed of various materials, it is preferably made of heat resistant plastic.

The number of support bars 36 is equal in number and spacing to fit the grooves 28. The frame 18 bars have an outer diameter (see FIG. 7) generally equal to the first mentioned diameter d1 of the outer peripheral surface 32 of the heating element 16 and an inner diameter generally equal to the second mentioned diameter d2 of the inner peripheral surface 34 of the grooves 28.

By virtue of these generally matched inner and outer diameters of the heating element 16 and support bars 36, and as can be seen in FIGS. 6 and 7, the annular frame 18 slidingly engages the grooves 28. Furthermore, the outer peripheral surface 40 of the support bars 36 is generally flush with the outer peripheral surface 32 of the heating element 16, thereby enhancing the transfer of the heat between the element 16 and the hair of a user. The outer peripheral surface 40 of the support bars 36 may be smooth, as is shown in the drawings, or it may be roughened or serrated to facilitate the holding of hair against the annular frame 18.

In this embodiment, the first end 20 of the annular frame 18 takes the form of a first annular member 42, also preferably made of heat resistant plastic, attached to the annular frame 18. Preferably the first annular member 42 is molded directly to the annular frame 18, but the first annular member 42 may also be attached by glue (as is generally shown in FIG. 2) or by a plurality of pins 44 (as shown in FIGS. 1 and 3) which extend through the first annular member 42 into the support bars 36. As is best shown in FIG. 4, the first annular member 42 has an inner diameter at least equal to the first mentioned diameter d1 of the outer peripheral surface 32 of the heating element 16 and forms a collar which commonly encircles the flush outer peripheral surfaces 32 and 40 of the heating element 16 and support bars 36.

The second end 22 of the annular frame 18 takes the form of a second annular member 46, also preferably made of heat resistant plastic, attached to the annular frame 18. Like the first annular member 42, the second annular member 46 is preferably molded directly to the annular frame 18, but it may also be attached by glue or a plurality of screws 48 extending into the support bars 36 (see FIGS. 5 and 6). As is best shown in FIG. 5, the second annular member 46 has an inner diameter which is less than the first mentioned diameter d1 of the outer peripheral surface 32 of the heating element 16 and an outer diameter generally equal to the first mentioned diameter d1 so that the second annular member 46 takes the form of a ring fastened in registry upon the frame 18.

Thus, as heretofore generally described, the first annular member 42 accommodates the sliding engagement of the support bars 36 within the grooves 28, whereas the second annular member 46 does not. The sliding engagement between the support bars 36 and the grooves 28 proceeds through the first annular member 42 until abutting engagement between the second annular member 46 and the outer end 24 of the heating element 15 occurs (as shown in FIGS. 1 and 5).

As shown in FIGS. 1 and 2, the length of the annular frame 18 is less than the length of the heating element 16 so that, when abutment between the second annular member 46 and the outer end 24 of the heating element 16 occurs, the first annular member 42 is located in a spaced relationship from the handle end 30 of the heating element 16. By virtue of this construction, heat expansion of the frame 18 is permitted during operation of the curling iron 12.

In the embodiment illustrated in FIGS. 3, 5 and 6, the heating element 16 has an internally threaded hole 50 centrally formed in its outer end 24. The fastening means 26 takes the form of a plug-shaped member 52 having an outer diameter generally equal to the outer diameter d1 of the heating element 16 and preferably made of a heat resistant material such as plastic or rubber. The plug member 52 includes an underbody portion 54 and an externally threaded pin 56 projecting downwardly from the center of the underbody portion 54. Rotation of the plug member 52 causes the pin 56 to threadably engage the hole 50, and the second annular member 46 is thereby sandwiched between the underbody surface 54 of the plug member 52 and the outer end 24 of the heating element 16. Movement of the annular frame 18 axially along the heating element 16 is thereby prevented. Also, by virtue of the engagement between the grooves 28 and the support bars 36, rotation of the grooming attachment upon the heating element 16 is likewise prevented.

It should be appreciated that the plug member 52 may be alternatively molded directly to the second annular member 46 to provide a heat resistant gripping surface to facilitate attachment and removal of the annular frame 18 upon the heating element 16. In this embodiment, the unitary annular frame 18 and plug member 52 may be held in place upon the heating element 16 by means of friction or by another suitable fastening mechanism, such as a spring-detent assembly (not shown).

As before mentioned, the particular structure of the hair grooming attachment 10 as just described may be varied to accommodate the particular curling or styling function desired. Just as there are numerous hair styles, there are numerous structural variations of the grooming attachment 10 which are possible. Two such variations are shown.

Referring to the first variation which is best shown in FIGS. 2 and 4, the attachment 10 includes a hair clamping member 58 which is pivotally attached on the annular frame 18 for movement between a first position (shown in solid lines in FIG. 2) angle from the annular frame 18 and a second position (shown in phantom lines FIG. 2) in which the hair clamping member 58 is located closely adjacent to the annular frame 18. While the pivot point may be variously located, in the illustrated embodiment, the first annular ring 42 includes a pair of outwardly projecting shoulders 68 (as best shown in FIG. 4) upon which the hair clamping member 58 is pivotally attached. The hair clamping member 58, which may be of either plastic or metal unitary construction, includes an outwardly projecting arm 60 extending over the handle 14 of the curling iron 12 so that the operator may easily control the pivotal movement of the clamping member 58 simultaneously with operation of the curling iron 12. Preferably, as is shown in FIG. 2, the outer tip of the clamping member 58 extends beyond the outer end 24 of the heating element 16 and over the heat resistant plug member 52, so that the operator is able to hold the outer tip cf the clamping member 58 against the plug member 52 to maintain the clamping member 52 in its secon position. The clamping member 58 also includes a generally concave clamping surface 62 which fits in registry with the flush outer peripheral surfaces 32 and 40 of the heating element 16 and support bars 36 when the clamping member 58 is in its second position. The operator is thus able to hold his or her hair in place between the concave clamping surface 62 and the outer peripheral surfaces 32 and 40 during the application of heat. Such use of the hair clamping member 58 facilitates the forming of small or "tight" curls.

Referring next to the second variation which is best shown in FIGS. 1, 5, and 6, the annular frame 18 includes a plurality of generally spaced outwardly projecting bristles 64. The bristles 64 are generally longitudinally spaced along each of the support bars 36 and collectively form a brush 66. Use of the brush 66 in combination with the curling iron 12 facilitates the making of large "loose" curls or waves.

In another embodiment shown in FIGS. 8 and 10, fastening means 70 is provided which is capable of being snapped on and off the second or outer end 24 of the heating element 16. The fastening means 70 constitutes an auxiliary handle and comprises a hollow, elongated body 72 including a generally ball-shaped member or ball 74 attached to an end 76 of the elongated body 72 by a neck 77.

To permit the attachment of the fastening means 70 to the heating element 16, the second end 24 of the heating element 16 includes an opening 80 to receive and hold the ball-shaped member 74. The opening 80 is coaxial with the longitudinal axis of the heating element 16. In the preferred embodiment, the heating element is made from hollow-extruded aluminum and a plug 82 is inserted into the second end 24 to form the opening 80.

To permit the ball 74 to snap in and out of the opening 80, the diameter of the ball 74 is larger than the diameter of the opening 80, and the ball 74 and neck 77 include a slot 78 which is coaxial with the longitudinal axis of the elongated body 28. As a result, when the ball 74 passes into or through the opening 80, the ball 74 is compressed inwardly by the opening 80. After the ball 74 passes through the opening 80, the ball 74 resumes its uncompressed contour and holds the fastening means 70 on the second end 24 of the heating element 16, until the ball 74 is forceably removed. This connection permits free, unlimited, bidirectional rotation of the auxiliary handle relative to the heating element.

In the embodiment illustrated in FIG. 10, the fastening means 70 is used to secure a sleeve 90, as hereafter described, on the heating element 16. The fastening means 70 does not secure a grooming attachment on the sleeve 90 in this embodiment, although it can in other embodiments.

In the embodiment illustrated in FIG. 9, a fastening means 71 is provided which is identical to fastening means 70, except the transverse diameter of the hollow body 72 is generally equal to the diameter d1 of the outer surface 32 of the heating element 16.

In addition to the snap on and off feature, the fastening means 70 and 71 provide a cool tip which, when grasped by the curling iron operator, remains stationary while the heating element 16 is rotated to curl hair on the curling iron.

In another embodiment, as illustrated in FIGS. 8, 10, and 11, means is provided for creating a large diameter heating element for use in forming large or "loose" curls and waves. The larger diameter heating element results from a sleeve 90 which slides over the heating element 16. The sleeve 90 includes an inner surface 92 and an outer surface 94.

The sleeve 90 has an inner diameter which is generally equal to the outer diameter d1 of the heating element 16. By virtue of these generally matched diameters, the sleeve 90 slides over the heating element 16, and the sleeve's inner surface 92 is flush with the outer surface 32 of the heating element 16, thus insuring good heat transfer between the heating element 16 and the sleeve 90. The sleeve 90, like the heating element 16, is made of a high heat transmissible material, such as aluminum.

The sleeve's inner surface 92 includes a pair of opposed tabs 96 received in corresponding grooves 28 on the outer surface 32 of the heating element 16. The tabs 96 thus received in the grooves 28 insure the sleeve 90 will not rotate relative to the heating element 16.

The outer surface 94 of the sleeve includes longitudinally extending grooves 98, which in the illustrated embodiment, are generally dovetail in shape (see FIG. 11) although other shapes can be used. The grooves 98 provide means, similar to the grooves 28 on the outer surface 32 of the heating element 16, of attaching a grooming attachment to the curling iron. In this embodiment, the grooming attachment comprises a plurality of individual support bars 102 engageable in each of grooves 98 on the sleeve's outer surface 94. The support bars 102 include a plurality of longitudinally spaced teeth 104 so that, when the bars 102 are located in the grooves 98 on the sleeve's outer surface 94, the teeth 104 extend radially outwardly from the sleeve 90. When the sleeve's grooves 98 and the heating element's grooves 28 have the same configuration, the support bars 102 can be used with the heating element 16 or with the combination heating element 16 and sleeve 90. Thus the same grooming attachment can be used to form small curls or waves with the heating element 16 or large curls and waves with the combination of the heating element 16 and sleeve 90.

It should now be apparent that through the interchangeable use of the illustrated variations of the hair grooming attachments just described, a single curling iron is operable for creating a variety of hair curls and styles.

Various of the features of the invention are set forth in the claims.

I claim:

1. A hair curling iron comprising a handle, an elongated heating element attached to said handle and having an outer circular peripheral surface, a first end adjacent to said handle, and a second end spaced outwardly from said handle, means defining a plurality of generally arcuately spaced, radially open grooves extending longituidnally on said outer peripheral surface of said heating element between said first end and said second end and being axially open at said second end, a plurality of longitudinally extending bars slidingly and removably engaged in said grooves through said open ends thereof and being in thermally conductive and heat exchanging relation with said heating element, said bar supporting radially extending hair grooming means, and fastening means constituting an auxiliary handle and being attachable to said second end of said heating element for preventing removal of said bars from said grooves while permitting free, unlimited, bidirectional selative rotation between said fastening means and said heating element.

2. A hair curling iron in accordance with claim 1 wherein said second end includes therein an opening coaxial with the longitudinal axis of said elongated heating element, and wherein aid fastening means comrpises an end member releasably attached to said second end of said heating element, said end member comprising a body member with an end, a generally ball-shaped member attached to said end, said ball-shaped member having a diameter greater than the diameter of said opening, and said ball-shaped member including a slot coaxial with said elongated body to permit said ball-shaped member to compress and pass through said opening so as to afford assembly and disassembly.

3. A curling iron according to claim 2 wherein said body member is hollow and elongated.

4. A curling iron according to claim 2 wherein said fastening means further includes a neck connecting said ball member to said end of said body member.

5. A hair curling iron comprising a handle, an elongated generally cylindrical heating element attached to said handle and having a circular outer surface, a first end adjacent to said handle and a second end shaped outwardly from said handle, means defining a plurality of generally arcuately spaced radially open grooves extending longitudinally on said outer surface of said heating element between said first end and said second end and being axially open at said second end, a removable thermally conductive sleeve slidably mounted on said heating element and having an inner surface in heat exchanging relationship with said heating element, at least one tab on said inner surface of said sleeve being slidably received in one of said grooves through said open second end thereof for preventing relative rotation between said sleeve and said heating element, and a removable hair grooming attachment slidasbly mounted on said sleeve.

6. A curling iron according to claim 5 wherein said outer surface of said sleeve includes means defining longitudinally extending arcuately spaced and radially open grooves having respective open outer ends, and wherein said grooming attachment comprises support bars slideably and respectively located in said grooves on said sleeve outer surface, said support bars each including therealong a plurality of longitudinally spaced and radially outwardly extending teeth.

7. A curling iron comprising a handle, an elongated generally cylindrical heating element attached to said handle and having a circular outer surface, a first end adjacent to said handle and a second end spaced outwardly from said handle, means defining a plurality of generally arcuately spaced radially open grooves extending longitudinally on said outer surface of said heating element between said first end and said second end and being axially open at said second end, a removable thermally conductive sleeve slideably mounted on said heating element and having an inner surface in heat exchanging relationship with said heating element and an outer surface, at least one tab on said inner surface of asid sleeve being slideably received in one of said grooves through said second open end thereof for preventing relative rotation between said sleeve and said heating element, said sleeve having an outer surface including means defining a plurality of generally arcuately spaced radially open grooves which extend longitudinally of said sleeve and are axially open at one end, and individual support bars which are removable from said grooves on said sleeve outer surface and receivable in said grooves on said heating element outer surface when said sleeve is removed from said heating element.

* * * * *